(12) United States Patent
Santhanam et al.

(10) Patent No.: US 9,840,782 B2
(45) Date of Patent: Dec. 12, 2017

(54) ELECTROCHEMICAL PROCESS FOR PRODUCING GRAPHENE, GRAPHENE OXIDE, METAL COMPOSITES, AND COATED SUBSTRATES

(71) Applicants: Kalathur S. V. Santhanam, Pittsford, NY (US); Satish G. Kandlikar, Rochester, NY (US); Valentina Mejia, Bridgeport, CT (US); Yang Yue, Rochester, NY (US)

(72) Inventors: Kalathur S. V. Santhanam, Pittsford, NY (US); Satish G. Kandlikar, Rochester, NY (US); Valentina Mejia, Bridgeport, CT (US); Yang Yue, Rochester, NY (US)

(73) Assignee: ROCHESTER INSTITUTE OF TECHNOLOGY, Rochester, NY (US)

( * ) Notice: Subject to any disclaimer, the term of this patent is extended or adjusted under 35 U.S.C. 154(b) by 154 days.

(21) Appl. No.: 14/800,316

(22) Filed: Jul. 15, 2015

(65) Prior Publication Data

US 2016/0017502 A1   Jan. 21, 2016

Related U.S. Application Data

(60) Provisional application No. 62/025,790, filed on Jul. 17, 2014.

(51) Int. Cl.
*C25B 1/00* (2006.01)
*C01B 31/04* (2006.01)

(52) U.S. Cl.
CPC .............. *C25B 1/00* (2013.01); *C01B 31/043* (2013.01); *C01B 31/0446* (2013.01)

(58) Field of Classification Search
CPC ...... C25B 1/00; C01B 31/043; C01B 31/0446
See application file for complete search history.

(56) References Cited

U.S. PATENT DOCUMENTS

| | | | |
|---|---|---|---|
| 3,677,969 A | 7/1972 | Mertzweller et al. | |
| 6,692,632 B1 * | 2/2004 | Bremner | C02F 1/461 205/413 |
| 2013/0001089 A1 | 1/2013 | Li et al. | |

FOREIGN PATENT DOCUMENTS

| | | |
|---|---|---|
| CA | 2418302 A1 | 8/2003 |
| CN | 102502611 A | 6/2012 |

OTHER PUBLICATIONS

International Search Report and Written Opinion for corresponding application PCT/US15/40615 dated Oct. 9, 2015.

* cited by examiner

*Primary Examiner* — Arun S Phasge
(74) *Attorney, Agent, or Firm* — Bond, Schoeneck & King, PLLC; Joseph Noto

(57) ABSTRACT

A process and system for the electrochemical production of graphene, graphene oxide, graphene quantum dots, graphene/graphene oxide metal composites, graphene/graphene oxide coated substrates and graphene/graphene oxide metal composite coated substrates in a single step process involving no secondary purifications utilizes an electrochemical cell containing electrodes with variable gaps including a zero gap, containing an anode electrode including graphite, a cathode electrode including electrically conductive material with an electrolyte-free electrochemical bath including water and an organic liquid that produces joule heating along with oxygen embrittlement.

24 Claims, 15 Drawing Sheets

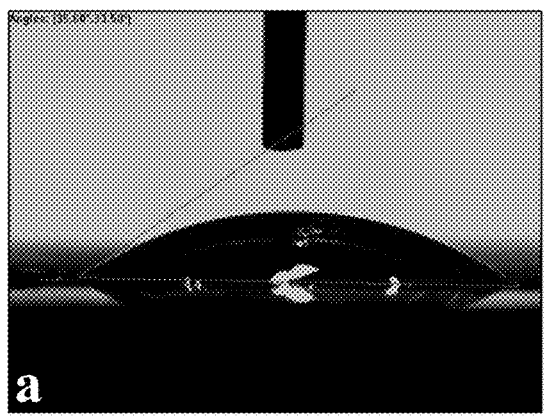 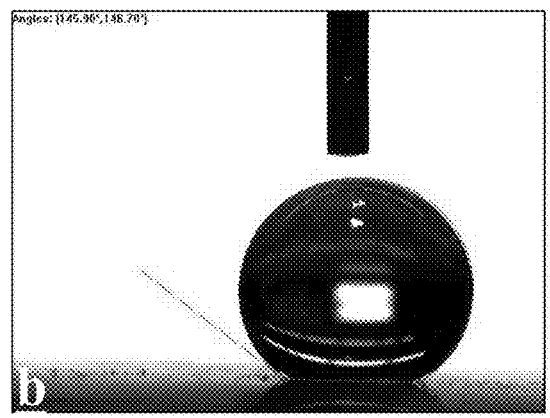
Fig. 8a                    Fig. 8b

ELECTROCHEMICAL PROCESS FOR PRODUCING GRAPHENE, GRAPHENE OXIDE, METAL COMPOSITES, AND COATED SUBSTRATES

CROSS REFERENCE

This application claims the benefit of the filing date of U.S. Provisional Patent Application Ser. No. 62/025,790, filed on Jul. 17, 2014, which is hereby incorporated by reference in its entirety.

This invention was made with government support from the National Science Foundation under CBET Award No. 1335927. The government has certain rights in this reference in its entirety.

FIELD

The present invention relates to an electrochemical process for producing graphene, and in particular, to an electrochemical process for producing graphene, graphene oxide, metal composites and coated substrates thereof.

BACKGROUND

A single layer of atomically sp2 bonded carbon atoms, called graphene is traditionally manufactured using methods such as micro mechanical exfoliation, chemical vapor deposition and laser ablation of graphite. These methods are generally expensive, need capital equipment, or need usage of large number of steps in producing graphene or graphene oxide.

A catalytic chemical liquid deposition (CCLD) process to grow carbon nanotubes (CNT) and carbon nanowires (CNW) and graphene on to a silicon substrate is known in the literature. The substrate was first prepared and coated with a Fe film using electron beam evaporation. CCLD using various growth parameters included changing the voltage, organic liquid, organic liquid-to-water ratio, reaction time, and sweep gas flow to achieve CNT, CNW and graphene growth. All tests were run under atmospheric pressure and consistent temperature (298 K). The surface composition was characterized using a SEM. Energy dispersion X-ray (EDX) and resonance Raman spectra were collected. The process was able to grow CNTs, CNWs, and graphene at a high rate as well as illustrate the growth process of these structures. See U.S. patent application Ser. No. 2003/0217928 to Yuehe Lin, Liang Liang, and Jun Liu.

It is known to use an ambient pressure chemical vapor deposition (APCVD) process to grow carbon nanotubes (CNT) and graphene onto copper foil. Methane gas was introduced on 1-5 nm Fe catalysts that were deposited onto the surface using electron beam evaporation. The substrate was then heated to 1023 K. $C_2H_4$ was introduced to promote CNT growth. SEM imaging was used to characterize the surface morphology. CNT and graphene were successfully deposited onto a copper substrate using APCVD. Another publication also used an APCVD process to successfully grow high quality graphene on copper substrates, albeit without catalysts applied to the substrate.

It is known to utilize a hot filament chemical vapor deposition (HFCVD) technique to deposit bamboo-like carbon nanotubes (BCNTs) onto a copper substrate. A tungsten filament was carburized in the HFCVD chamber before the deposition process. The copper substrate was polished with various grit sizes until finally being polished with <1 micron diamond powder. A gas mixture of 2.0% $CH_4$, 98% $H_2$ with 500 ppm of $H_2S$ at a pressure of 20 torr was used and the filament temperature was maintained at ~2773 K. The substrate temperature and deposition time were altered to investigate different BCNT growth patterns. Surface characterization was accomplished using SEM and Raman spectroscopy. The BCNTs were deposited onto a copper substrate without any catalyst and found that as the substrate temperature increases, approaching the copper melting point, the BCNT growth patterns changed from a microcyrstalline diamond to a dense entangled network of CNTs.

It is known to use a Low Pressure Chemical Vapor Deposition (LPCVD) set-up to grow graphene layers on copper foil. First the copper foil substrate was annealed and placed in the LPCVD chamber and a gas mixture of $CH_4$, Ar and $H_2$ was introduced into the chamber. Once deposition was complete the chamber temperature was quickly cooled to approximately 673 K. The purity of the copper film was found to be a key factor in controlling the graphene synthesis as well as the minimum partial pressure of the hydrocarbon.

Other processes have also employed chemical vapor deposition (CVD) to successfully grow graphene/CNT on to copper substrates. A CVD process was used to deposit graphene-CNT hybrids onto copper foil. The copper foil was coated with silicon nanoparticles (Si NPs) and placed in quartz tube furnace at 1073 or 1173 K. Then ethanol vapor was introduced to the tube to promote graphene-CNT hybrids. The surfaces were then characterized by using a scanning electron microscope (SEM) and transmission electron microscope (TEM). The surface characterization showed that the graphene-CNT hybrids sprouted from the Si NPs. This method provides a way to obtain the desired CNT properties by altering growth conditions and Si NP size, density and arrangement. Another method successfully tested methanol, ethanol and 1-propanol as gas mixtures during CVD, potentially making the fabrication of graphene, more accessible, cheaper and safer.

Others developed an electrochemical exfoliation process for the deposition of graphene oxide (GO) onto a copper foil surface. The GO was washed and placed in an electrolytic bath of 250 g/L copper sulphate. In addition $H_2SO_4$ was added to maintain pH, and PAA5000, a surfactant, was added to prevent agglomeration. The optimum content dispersion was found to be 0.5 gm/L. The electrodeposition system contained an electrolytic Cu (99.99%) anode and a titanium cathode. Note that the titanium cathode first had a 2 μm Cu film applied before deposition to act as a seed layer. The document characterized the surface morphology, studied the distribution of graphene in the composite foil, and examined the product using a Field Emission Scanning Electron Microscope, Focused Ion Beam, and Transmission Electron Microscope. The methodology achieved superior mechanical properties as a result of the composite nature of the product, while at the same time maintaining the electrical conductivity of pure Cu.

There exists a significant body of research pertaining to the study of depositing CNTs or graphene onto different substrates, and as it more relates to, copper. CVD appears to be the most common method of deposition and has resulted in successful deposits. However, this method, as well as other variants (HFCVD, APCVD, plasma enhanced chemical vapor deposition (PECVD)), requires specific equipment, materials, and some also involve relatively complex preparation and procedure.

In patents granted on the electrochemical production of graphene, electrolytes have been added into the medium to reduce the resistance of the medium. Addition of an electrolyte into a medium is generally known to increase the conductivity of the medium. Since conductivity is reciprocal of resistance, addition of an electrolyte reduces the electrical resistance of the medium. Thus, the medium property is altered. In addition in some patents the electrolyte added undergoes oxidation at the anode or reduction at the cathode. These processes initiate the formation of graphene, however require an electrolyte added to the electrolytic bath.

The CVD methods and the existing electrolytic methods require multiple steps for producing graphene or graphene oxide. The CVD methods require the use of metal catalyst for the decomposition of the starting material. The end product of these methods is graphene/graphene oxide containing the metal catalyst. The catalyst will have to be removed for obtaining pure graphene/graphene oxide. This removal involves either chemical treatment to complex the metal or removal by physical or chemical methods. The electrolytic methods produce impure graphene/graphene oxide in a bath containing surfactants or electrolytes that need to be removed by physico-chemical methods. Both the methods involve multiple step processes.

Electrolytes are substances that dissolve in water to produce ions which carry the current in electrolysis. The electrolytes are generally composed of a metal and a nonmetal. When dissolved in water, the metal part of the electrolyte forms its ion (cation) and the non-metal part of the electrolyte forms its ion (anion). The negatively charged anion will have a tendency to get oxidized at the anode and has been used in known electrochemical processes utilizing an electrolyte for cleaving the graphite to produce graphene. However, in such cases, the presence of electrolytes in the bath results in byproducts which then have to be removed from the solution. In a large number of cases electrolytes containing ions, such as iodide ion, bromide ion, chloride ion and the like, the oxidation of these ions precedes the oxidation of water and hence will control the extent of the graphene cleavage. Thus, the art lacks an efficient single step electrochemical process for the production of pure graphene/graphene oxide.

SUMMARY

In accordance with one aspect of the present disclosure, there is provided an electrolyte-free electrochemical process for producing graphene/graphene oxide including immersing in an electrochemical bath, including water and an organic liquid, an anode electrode including graphite and a cathode electrode including an electrically conductive material; and applying an electrical potential between the anode and the cathode, sufficient to cause Joule heating and oxidation of the water and cleavage of graphene by embrittlement from the graphite anode forming graphene/graphene oxide and at least one of convective migration and electrical migration of the cleaved graphene.

In accordance with another aspect of the present disclosure, there is provided an electrochemical process for producing graphene/graphene oxide metal composites including immersing in an electrolyte-free electrochemical bath, including water and an organic liquid, an anode electrode including graphite and a metal component and a cathode electrode including an electrically conductive material; and applying an electrical potential between the anode and the cathode sufficient to cause Joule heating and oxidation of the water and the metal component, formation of ions of the metal, and cleavage of graphene by embrittlement from the graphite anode forming a graphene/graphene oxide metal composite and at least one of convective migration and electrical migration of the cleaved graphene and formed metal ions.

In accordance with another aspect of the present disclosure, there is provided an electrochemical process for producing a metal/graphene composite including immersing in an electrolytic bath, including a graphene/graphene oxide solution and an electrolyte, an anode electrode and a cathode electrode including an electrically conductive material; and applying an electrical potential between the anode and the cathode, sufficient to cause deposition of a metal/graphene composite.

These and other aspects of the present disclosure will become apparent upon a review of the following detailed description and the claims appended thereto.

BRIEF DESCRIPTION OF DRAWINGS

FIG. 8a is an image showing the measurement of the average contact angle of 34.5° for toluene (a) deposition and FIG. 8b is an image showing the measurement of the average contact angle of 146.3° for carbon tetrachloride (b) deposition;

DETAILED DESCRIPTION

Figure 1:
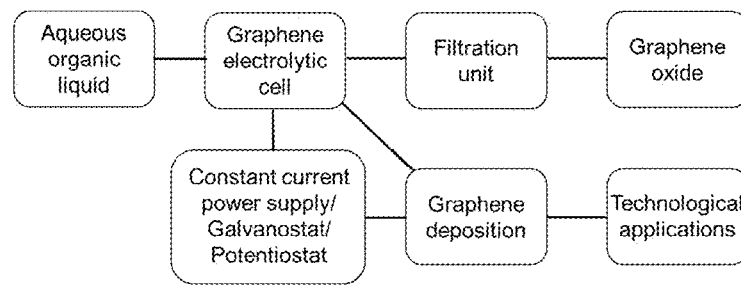
FIG. 1 is a schematic flow chart illustrating the synthesis of graphene/graphene oxide/metal composites in accordance with an embodiment of the present disclosure.

The present disclosure relates to a process and system for the electrochemical production of graphene, graphene quantum dots, graphene oxide, graphene/graphene oxide metal composites, graphene/graphene oxide coated substrates, and graphene/graphene oxide metal composite coated substrates. An embodiment includes a single step process involving oxygen embrittlement. In accordance with an embodiment, the disclosure includes an electrochemical cell containing an anode electrode including graphite, a cathode electrode including an electrically conductive material, and an electrochemical bath in contact with the electrodes. The process includes supplying an electrical potential between the electrodes. In an embodiment, the process and system includes the electrochemical oxygen embrittlement exfoliation of a graphite electrode in a non-electrolyte bath through joule heating.

The resulting graphene, graphene oxide, and combinations thereof in the solution in the electrochemical bath produced in accordance with an embodiment of the present disclosure is useful for coating substrates, such as metals, semiconductors and electronic devices, by dip coating or other forms of coating to produce a layer of graphene/graphene oxide on the substrate. In one example, a copper metal is dip coated by immersing the metal in the bath solution for a period of three minutes to produce a fine smooth coating of graphene/graphene oxide.

The electrochemical bath in accordance with the present disclosure includes water and an organic liquid. In an embodiment, the water is free of any added electrolytes. Most preferred is deionized water. Suitable organic liquids in accordance with the present disclosure include, but are not limited to, toluene, carbon tetrachloride, methylene chloride, methyl amine, acetonitrile, and the like. In an embodiment, the bath contains from about 1% to about 10% concentration of organic liquid, in another embodiment about 10% organic liquid, in water. Suitable concentrations of the organic liquid are extendable on either side of this range (higher or lower) depending on the system and required functionality for individual components in the solution. In an embodiment, the bath is free of any added electrolyte. In an electrolyte-free bath, the oxidation of water initiates the oxygen embrittlement of the graphite to cleave graphene sheets from the graphite electrode surface.

Some solutes when dissolved into a solvent do not split into their ions. For example, methyl alcohol or ethyl alcohol (solute) will dissolve in water (solvent) but they do not produce ions. Such substances are called non-electrolytes. Non-electrolytes are substances that when dissolved in water do not produce ions in the medium. They do not increase the conductivity of the solvent. As ions are required for electrical conduction, addition of a non-electrolyte will not change the original conducting property of the medium.

An electrolyte is defined as a solute that when dissolved in a solvent produces ions. The solute is a substance that is added into a solvent. The solute-solvent interaction brings out the separation of solute into its ions. For example, a substance such as solid sodium chloride (solute) (NaCl) is added to water (solvent). Sodium chloride dissolves in water and hence in water the solid cannot be observed. By carrying out conductivity measurements, it has been shown that when the solid dissolves it exists in the solution in the form of ions. Thus, when solid sodium chloride is dissolved in water, it exists as sodium ion and chloride ion in water. Most all ionic compounds are soluble in water and when they dissolve they exist as ions. Ionic compounds are formed by combination of a metal and a nonmetal. In the above example of NaCl Na is a metal and Cl is a nonmetal. The electrolytes are further subdivided into two classes. The solute that is dissolved into a solvent, completely splits into its ions is called a strong electrolyte. An example is NaCl. Substances dissolving into water existing partly as ions and partly in molecular form are called weak electrolytes.

An organic compound is made of carbon and hydrogen; some compounds may have a halogen or nitrogen or sulfur along with carbon and hydrogen. For example, methane is made of carbon and hydrogen; it contains one carbon atom and four hydrogen atoms. If one of the hydrogen atoms is replaced by one chlorine atom, it is labelled as methyl chloride. If another hydrogen atom is replaced by chlorine, it is called dichloromethane. If all the hydrogen atoms of methane are replaced by chlorine atoms then that molecule is called carbon tetrachloride. When a compound is in a liquid form (there are three phases in which a molecule can exist; solid, liquid and gas) then it has neither rigidity like a solid nor movement as a gas. A liquid has a finite temperature at which it boils and goes into gaseous phase. It also has a finite temperature at which it becomes a solid.

The definition of an organic liquid is a compound containing carbon atoms and hydrogen atoms. In addition to carbon, it may contain other atoms like chorine or bromine or oxygen or sulfur or nitrogen. A majority of organic liquids are volatile. They have low boiling points. Organic liquids are used for a number of purposes such as dry cleaning, nail polish removers, in perfumes and chemical synthesis. Organic liquids like carbon tetrachloride, tetrahydrofuran, methanol, ethanol, and the like all fall into the class of non-electrolytes.

An electrolyte-free electrochemical bath is an electrochemical bath that does not contain an added electrolyte to the bath, e.g., an electrochemical bath containing non-electrolytes.

Moreover, the bath can include typically known non-ionic additives, such as colloid stabilizers, surfactants, and the like, depending on the specific reactions, reaction rates, products and process control desired. Suitable additives can also include electrolytes, which are ionic compounds or inorganic acids, such as boric acid, sodium chloride, sodium bromide, sodium iodide, sodium chlorate, sodium perchlorate, sodium sulfate and such ionic salts, which are permitted in trace amounts so long as they do not detrimentally affect the oxidation of water and embrittlement in accordance with the disclosure. When the electrolyte is present in small amounts, predominance of oxidation of water can be favored in place of oxidation of the electrolyte ion by other factors, including but not limited to the current density applied, the concentration of the electrolyte ion, and the surface morphology of the anode.

In an embodiment, by using a bath of deionized water and organic liquid (e.g. from 1 to 10%) with a graphite anode and copper cathode applying a current density 100% pure graphene/graphene oxide in colloidal dispersion can be produced when no additives or electrolytes are added to the bath. Since the bath is free of these added additives or ions, there is no need to purify the sample in multiple steps to prepare pure graphene/graphene oxide.

In another embodiment, a bath containing deionized water and soluble organic liquid (e.g., 1 to 10%) with a graphite anode and a copper cathode, can produce deposits on the cathode containing carbon nanotubes, graphene and graphene oxide at a current density of from about 100 to about 300 $mA/cm^2$. In this embodiment no additives or electrolytes are added to the bath.

The bath solution is resistive for the flow of the applied current and the passage of the current in accordance with the present disclosure results in the Joule heating of the bath. No additional source of heating is required. Joule heating is resistive heating caused by the electron flow through a resistor; charged particles are accelerated in an electrolytic solution by the applied electric field. The impeded movement causes the heating. In electrolytic solutions, this process is controlled by the number of ions in the solution. When fewer ions or no ions are present in the solution, the resistance for the flow of ions is high and this results in vibrational energy of the ions as heat and a rise of the temperature. As a result of the joule heating, a thermal convection current is established in the electrochemical bath in accordance with the disclosure. The joule heating is dependent on the electrolytic medium resistance. The oxidation of water is an endothermic process and hence the sole contributor to heating is the resistive heating due to passage of the current. The addition of electrolytes in the medium will have an undesired tendency to reduce the resistance and the extent of joule heating. Thus, an electrolyte-free bath optimizes convective currents. The process does not require external heating of the bath solution.

Suitable electrodes in accordance with the present invention include a graphite anode and an electrically conductive material cathode. Suitable graphite materials include natural crystalline flake graphite, artificial graphite, natural amorphous graphite, highly oriented pyrolytic graphite, polyacrylonitrile fiber-based graphite, pitch-based graphite, and the like. Suitable electrically conductive materials include, but are not limited to, non-dissolving metals, Cu, Pt, Ag, Al, Pd, Mo, Rh, Ir, Ti, Ta, Zn, In, Sb, Te, Zr, Pb, W, alloys, and the like. The electrically conductive material cathode includes semiconductors made of inorganic materials, such as, ZnO, $TiO_2$, $SnO_2$, and the like. The cathode can also include electronic devices that are composed of electrically conducting materials.

In an embodiment, the potential applied across the electrodes introduces a current density of preferably from about 0.01 $mA/cm^2$ to about 500 $mA/cm^2$. Preferably, the potential is direct current (D.C.). Preferred current densities are in the range of from about 0.1 $A/cm^2$ to about 0.5 $A/cm^2$, and from about 0.01 $A/cm^2$ to about 10 $A/cm^2$. Higher and lower current densities can be employed. The relative orientation of the electrodes is a related factor for the effective current densities and convection currents produced. The controlled current densities and potential monitoring of the graphite electrode during the synthesis of graphene offer information on the mass transfer processes. The process duration can range from about 1 second to about 900 seconds, and can be extended to multiple hours and days. Preferably, the current density across the electrodes is sufficient to cause the oxidation of water to produce oxygen at the graphite anode to cleave the graphite surface into graphene. The evolution of oxygen gas sets up convection currents in the bath. The separation distance between the anode and the cathode is important for electrolytic cleavage of graphite into graphene. This involves evolution of oxygen on the graphite resulting in oxygen embrittlement. In an embodiment, the methodology adopted involves constant current passage through the bath while monitoring the potential of the graphite. The electrodes are preferably mounted in a parallel configuration which results in vigorous evolution of oxygen at the anode. The bath temperature in one example increased from about 293 K to about 343 K. The bath temperature rise is related to the operating conditions, such as current density, joule heating and the system configuration. As the current is passed the cleaved graphite (graphene) peels off from the graphite anode electrode or reacts with oxygen to form graphene oxide and disperses within the bath. The dispersed material floats on the surface of the bath or settles down in the bath. Some of the dispersed material dissolves in the bath in colloidal form. When a non-dissolving material, such as copper, is used as the cathode, there is a definitive deposition of graphene/graphene oxide that is strongly adherent to the cathode. The contact angle measurements of deposited material range from about 30 degrees to about 172 degrees indicating presence of both graphene oxide and graphene in different regions of the deposits on the cathode surface. The electrical resistance of a single flake of about 0.8 mm thickness was measured to be between about 1 and about 2 ohms.

The oxidation of water generates oxygen gas at the graphite anode. This involves a large number of steps of water percolating into graphite and undergoing four electron oxidation to produce oxygen gas in the form of bubbles. The oxygen gas within the graphitic layers breaks the carbon-carbon bonds, the edges of the cleaved carbon form the C—O bond and this is observed in the FTIR at 1010 $cm^{-1}$ (representing C—O bond (epoxide)). This is representative of oxygen embrittlement to produce thin layers of graphene and graphene oxide. Graphene dissolves partly in the bath containing the organic liquid. Since there is agitation between the layers of water and the organic liquid, graphene is constantly removed from the surface of the graphite electrode. The convection resulting from thermal gradients and the bubble stirring effect is responsible for agitation in the two immiscible liquids (water and organic liquid). In the case of miscible organic liquids, such as acetonitrile, the process may generate different carbon structures, such as carbon nanotubes, along with the graphene and graphene oxide. The rate of cleavage of graphite at the anode is a function of temperature as the transport processes involved are temperature dependent.

The dispersed graphene/graphene oxide solution exhibits a characteristic fluorescence that is generally used as a benchmark for identification. The spectral features of the material obtained showed two well defined peaks of 1817 and 1010 $cm^{-1}$ in FTIR (Fourier Transform Infrared Spectroscopy). The scanning electronic microscope pictures reveal structures similar to authentic samples of graphene. The images were also taken using a confocal laser microscope.

The formation of graphene is related to among other things, the shape, orientation, geometry of the electrodes, and the extent of convection in the bath. Certain orientations are preferred for oxygen embrittlement and deposition of graphene/graphene oxide at the cathode. In one embodiment, the deposition of graphene/graphene oxide on the substrate electrode can be controlled by the geometry and shape of the substrate. While the preferred orientation is planar, this could be extended to curved, or any other shape type including porous, mesh, or sieve, having surface features including but not limited to nanostructures, microstructures, nanowires, and hierarchically structured surface with the hydrodynamic flow. The electrodes can be of any shape including circular, rectangular, triangular, two-dimensional or three-dimensional contoured surfaces.

The preferred distance between the electrodes relates to the electrode configuration. The distance may be from several micrometers to several centimeters. A preferred distance is between about 0 mm and about 10 mm, and more preferred distance is between about 1 mm and about 5 mm, for a 10 mm square exposed electrode used in one embodiment. The distance may be adjusted greater or smaller depending on the size and shape of the electrode and other system parameters and can include zero gap.

The produced graphene/graphene oxide migrates from the graphite electrode by convective migration and electrical migration. The convective migration arises from the thermal convection that develops in the bath as the temperature rises from joule heating. Additional convection may be introduced by circulating the bath liquid. The electrical migration arises from the electric field that is operating in the electrochemical cell that drives charged species to move towards opposite polarity. In other words the charged graphene/graphene oxide possessing a positive charge will move towards the cathode. This situation will be predominant with the production of graphene oxide. With high current density experiments, the bath temperature increases progressively to a high value of 343 K in one example. In such situations the convective migration predominates transporting more graphene/graphene oxide to the cathode. Concurrently, this situation of high current density also results in high electric fields ($3\times10^3$ V/m) that tend to drive graphene/graphene oxide to the cathode for maximum deposition. At lower current densities the solution color is lighter and the amount of graphene/graphene oxide deposited to the cathode is lower. The typical electric fields generated are in the range of about $2\times10^2$ to about $5\times10^2$ V/m. As the convection in an electrochemical cell is dependent on the electrode orientation, the placement of the cathode over the anode results in heavy deposition of graphene on the cathode with less dense color in the solution due to the directions of the convective field and gravitational field. For example, as the anode where the oxygen embrittlement occurs is located at the bottom of the electric field, the gravitational pull operates downwards to reduce the convection in the electrochemical bath.

An embodiment of the disclosure includes a system for production of graphene/graphene oxide metal composite. Graphite and an electrochemically oxidizable metal are bonded or in close proximity together to form the anode that will replace the graphite anode described earlier. Suitable electrochemically oxidizable metal includes Cu, Pt, Ag, Al, Pd, Mo, Rh, Ir, Ti, Ta, Zn, In, Sb, Te, Zr, Pb, W, and the like. The cathode is typically made of electrically conducting materials, including non-dissolving metals, Cu, Pt, Ag, Al, Pd, Mo, Rh, Ir, Ti, Ta, Zn, In, Sb, Te, Zr, Pb, W, and the like. The cathode can be semiconductors made of inorganic materials, such as ZnO, $TiO_2$, $SnO_2$, etc. The cathode could also be electronic devices that are electrically conducting materials. The electrodes are immersed in the bath of deionized water containing 10% organic liquid in one example and a constant current is passed through the electrochemical cell. At the anode the occurrence of both oxygen embrittlement of graphite and the oxidation of the metal to its ion occurs and results in the formation of a metal composite, as both the graphite and oxidizable metal are electrically in contact with the bath for concurrent oxidations. In one example, copper and graphite were intimately in contact to form the anode and a plate copper was used as the cathode. This example resulted in copper composite formation. The bath turns from colorless to light green during this experiment.

The uniqueness of the process is concurrent deposition of graphene/graphene oxide on the substrate electrode for technological applications. In one example, the graphite anode and copper cathode separated at a fixed distance of 1 cm both having surface areas of 1 $cm^2$ in a parallel configuration generated a black deposit on the copper cathode at a current density of 0.3 $A/cm^2$ in the duration of 900 seconds. In addition a copious amount of graphene/graphene oxide was in the bath that could be isolated by simple filtration. The black deposit showed contact angles of 30 degrees in some regions and 120 degrees in other regions. The bath temperature in the above example rose from 293 K to 333.3 K.

The bath may be operated in a continuous mode by introducing the bath solution at a rate suitable for the production of graphene/graphene oxide or its metal composite and removing the solution from the bath.

In one embodiment, the yield of graphene is estimated at about 0.20 $g/5.5\times10^{-1}$ Faraday ("F"). The graphene deposited on copper cathode shows distinct features in XRD at 2 theta reflections at 10°, 19°, 43.6°, 50.8° and 74.4°. The first two reflections are attributed to graphene oxide. The other three reflections are due to Cu (111), (200) and (220). The FTIR spectrum showed the vibrational stretching at 1780 $cm^{-1}$ and 1010 $cm^{-1}$.

FIG. 1 is a schematic flow chart illustrating an embodiment of the synthesis of graphene/graphene oxide/metal composites. The graphene electrochemical cell can include a glass beaker containing the electrochemical bath containing two/three electrodes. The electrodes are graphite plate, copper plate and a reference electrode. The filtration unit can contain a glass funnel with a Whatman 41 filter paper. After the electrolysis the solution is poured through the filtration unit. The filtered solution contains graphene/graphene oxide. At the end of the electrolysis, the copper cathode that is covered with graphene copper composite is the graphene deposited substrate.

Aspects of the disclosure include:

A process and system for the electrochemical production of graphene in a single step process.

A process and system for the electrochemical production of graphene oxide in a single step process.

A process and system for the electrochemical production of graphene-metal composite in a single step process.

A process and system for the electrochemical production of graphene coating in a single step process.

A process and system for the electrochemical production of graphene oxide coating in a single step process.

A process and system for the electrochemical production of graphene-metal composite coating in a single step process.

An electrochemical process involving a non-electrolyte bath.

The electrochemical bath solution is a coating material for graphene.

The electrochemical bath solution is a coating material for graphene oxide.

Orientation of the electric field in the bath relative to the gravitational field for controlling the convection in the bath for a denser coating of graphene.

Orientation of the electric field in the bath relative to gravitational field for controlling the convection in the bath for a denser coating of graphene oxide.

Orientation of the electric field in the bath relative to gravitational field for controlling the convection in the bath for producing graphene.

Orientation of the electric field in the bath relative to gravitational field for controlling the convection in the bath for producing graphene oxide.

Oxygen embrittlement of graphite to produce graphene.

Oxygen embrittlement of graphite to produce graphene oxide.

Oxygen embrittlement of graphite to produce graphene-metal composite.

An electrochemical bath containing an organic liquid for coating of graphene.

An electrochemical bath containing an organic liquid for coating graphene oxide.

An electrochemical bath containing an organic liquid for coating graphene-metal composite.

A technique for providing a coating solution of graphene for electronic devices.

A technique for homogenizing immiscible organic with water using a graphene mediator.

A D.C. current density up to about 500 mA/cm$^2$ and beyond is used for producing graphene.

A D.C. current density up to about 500 mA/cm$^2$ and beyond is used for producing graphene oxide.

A method for coating non-dissolving metals, alloys and semiconductors with graphene.

A method for coating non-dissolving metals, alloys and semiconductors with graphene oxide.

Joule heating of the electrochemical bath in the production of graphene.

Joule heating of the electrochemical bath in the production of graphene oxide.

Joule heating of the electrochemical bath in the production of graphene-metal composite.

The distance between anode and cathode between 0 mm to 10 mm in the production of graphene.

The distance between anode and cathode between 0 mm to 10 mm in the production of graphene oxide.

The distance between anode and cathode between 0 mm to 10 mm in the production of graphene oxide.

The XRD characterization of graphene and graphene oxide.

The thermogravimetric analysis of graphene/graphene oxide.

The Scanning electron microscope features of graphene and graphene oxide.

The FTIR spectrum of graphene/graphene oxide.

The electrochemical characterization of the graphene-metal composite.

The fluorescence spectral features of graphene/graphene oxide.

Contact angle measurements of coated graphene.

Contact angle measurements of coated graphene oxide.

Laser confocal images of coated graphene.

Laser confocal images of coated graphene oxide.

An electrochemical bath consisting essentially of water and an organic liquid.

The disclosure will be further illustrated with reference to the following specific examples. It is understood that these examples are given by way of illustration and are not meant to limit the disclosure or the claims to follow.

Example 1

Figure 3:
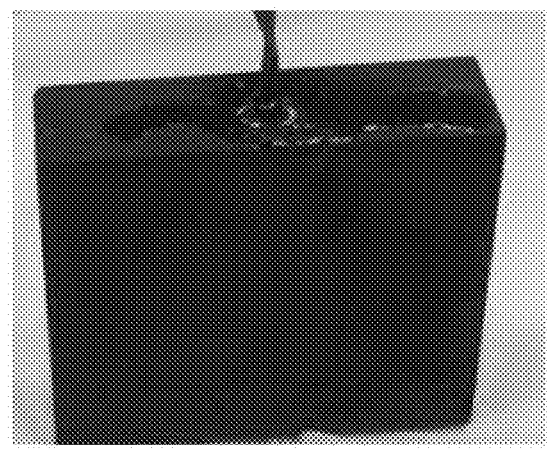
FIG. 3 is a picture of a graphite plate used as the anode in examples of the present disclosure.

In this example, graphene/graphene oxide is deposited on a copper substrate. A graphite plate (2 cm×2 cm; and a thickness of 0.70 cm) is cleaned by washing with deionized water. The plate is then dried and covered with paraffin wax or para film such that only a 1 cm$^2$ area is exposed for contacting the electrochemical bath. The plate is then firmly connected electrically to a copper wire through a hole provided for the wire at the center of the graphite plate (see FIG. 3). The copper wire and the region around it do not come in contact the bath. A Teflon spacer is used to hold the bottom end of the graphite plate in place vertically as shown schematically in FIG. 4.

Figure 4:
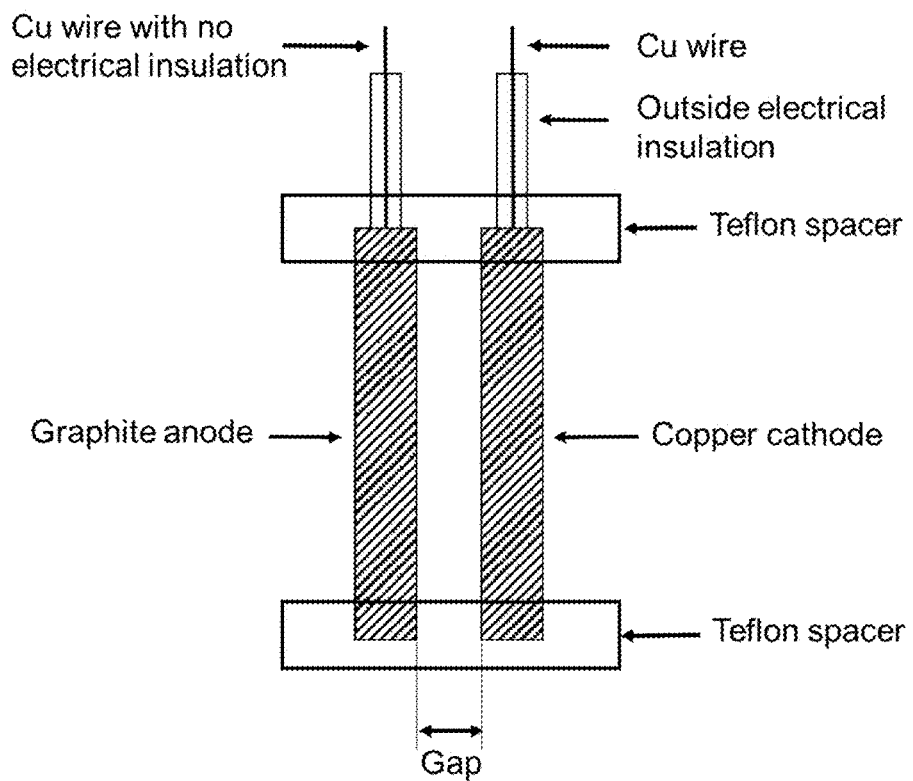
FIG. 4 is a drawing illustrating an assembly of electrodes, Teflon spacers and electrical leads, with copper exposed to an electrochemical bath in accordance with an embodiment of the present disclosure.

A copper block (1.6 cm×1.6 cm; and a thickness of 0.07 cm) was machined and cleaned with a solution of 6 M hydrochloric acid by dipping the block in the solution for 1-3 minutes. The cleaned copper block was washed with tap water for several minutes until the washings showed a pH=7. This is followed by deionized water washing of the block. The copper block is dried and covered with paraffin wax or para film such that only one square cm area of the copper plate is exposed. This region is exposed to the bath. The copper block is connected to a copper wire for electrical contact at the top, and the bottom end was secured in the Teflon spacer as shown in FIG. 4. After a tight fit of the graphite and copper plates in the bottom spacer, the top spacer is placed to hold these two electrodes securely. The exposed areas of graphite and copper blocks not covered with paraffin wax or para film are facing each other as they are held in the Teflon spacer.

Figure 2A:
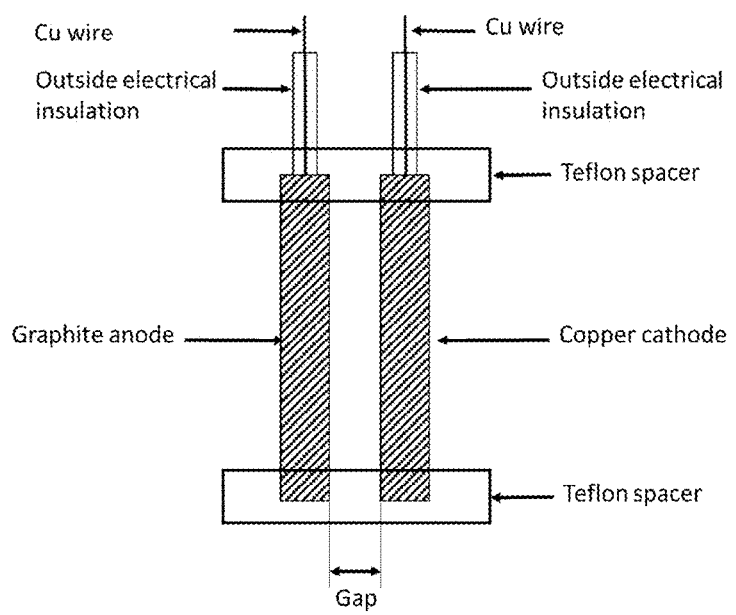
FIG. 2a is a drawing illustrating an assembly of electrodes, Teflon spacers, and electrical leads in accordance with an embodiment of the present disclosure.

A clean 50 ml beaker is washed with deionized water and clamped rigidly to a stand. The electrochemical bath is made by mixing 9 ml deionized water with 10% carbon tetrachloride. This mixture is added to the beaker completely after a short shake of the liquids. The electrode assembly as shown in FIG. 2a is placed inside the beaker. The top copper wires on both graphite and copper electrodes do not come in contact with the bath. A temperature sensor is also placed inside the bath close to the graphite anode but well in the liquid to record the temperature. The electrodes were connected to a constant current power supply through a current meter. The graphite was the anode and the copper block was the cathode. A current of 100 mA was set with an applied voltage of 20 V. During this electrolysis, gas bubbles visibly appeared. The temperature of the bath rose from 295 K to 315 K.

Figure 5A:
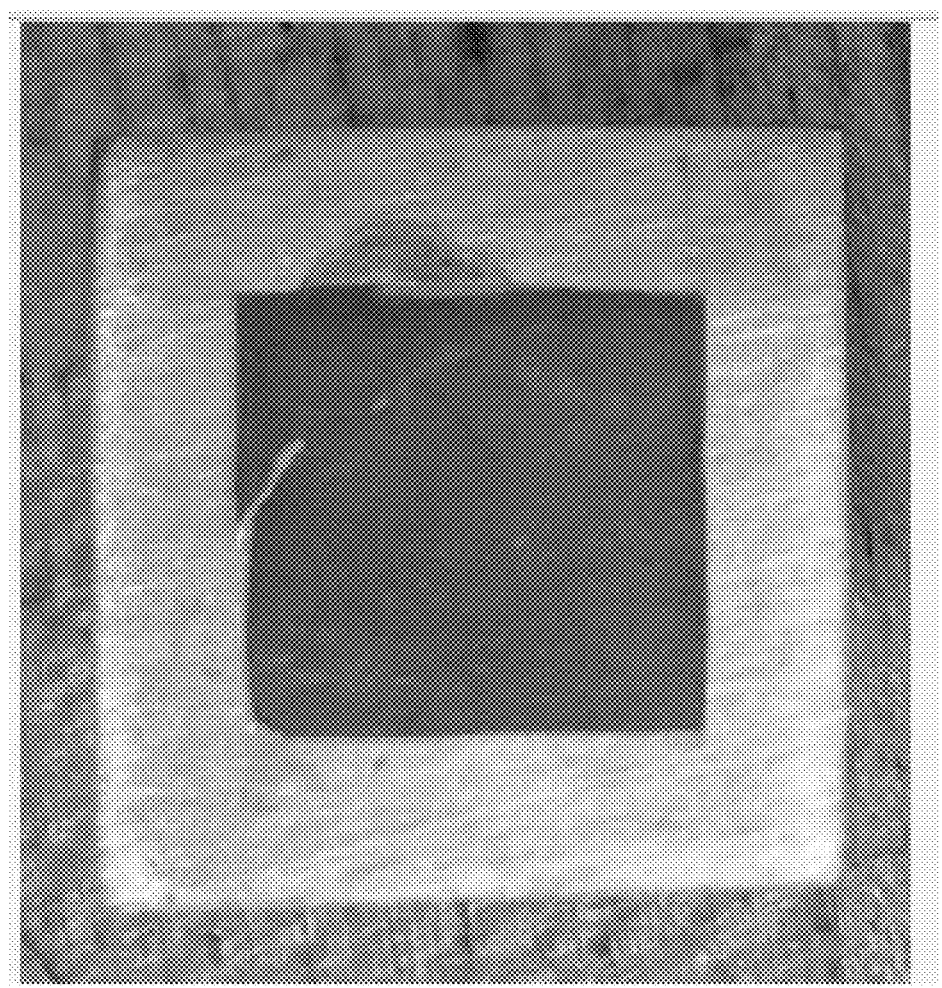
FIG. 5a is an image of the surface of the chip showing graphene/graphene oxide deposit on the copper block region after an experiment.
Figure 5B:
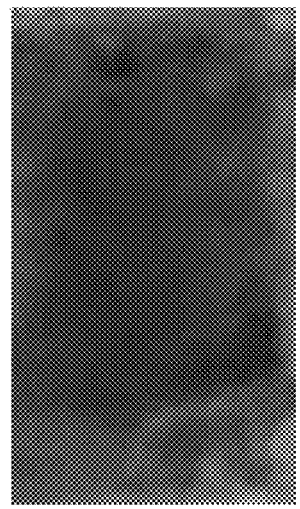
FIG. 5b is an image showing an expanded view of the deposit after an experiment.
Figure 6:
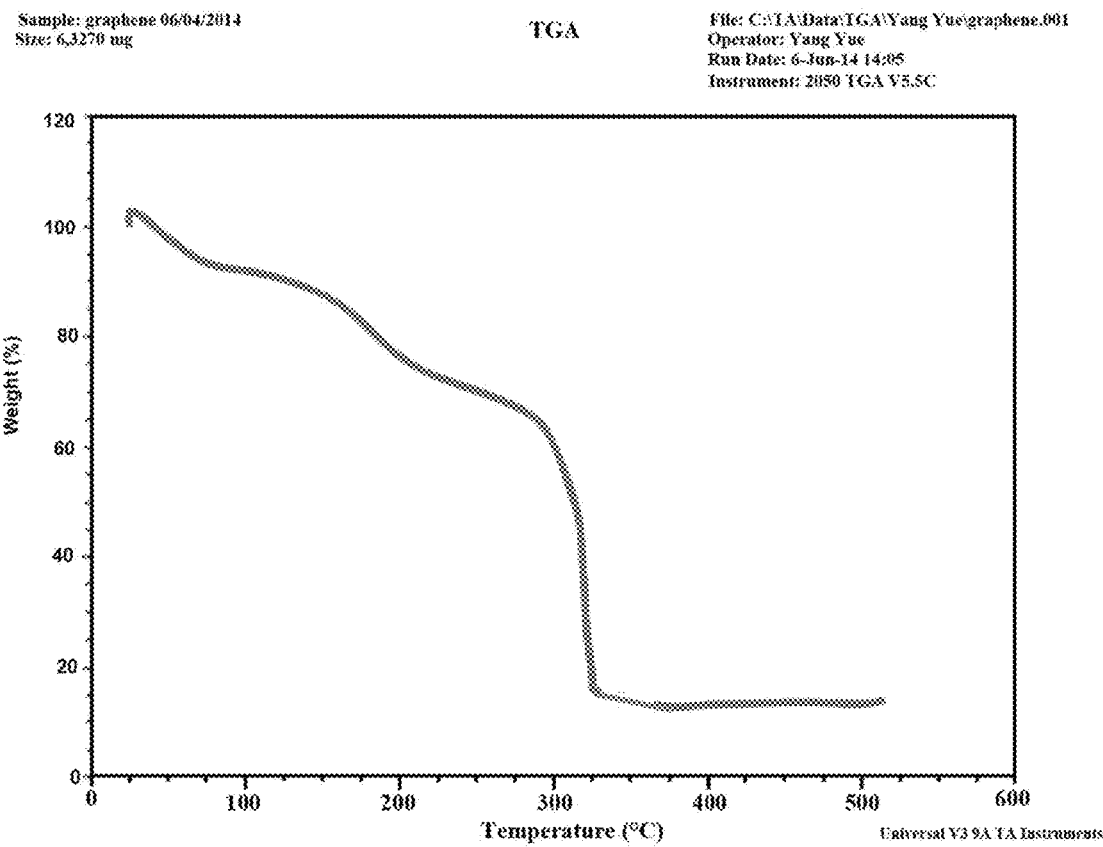
FIG. 6 is a graph of TGA of graphene particles produced in Example 1.

At the end of two hours of electrolysis, the electrode assembly is taken out of the beaker and the electrodes are dismantled. The copper electrode has a black adherent deposit as shown in FIG. 5. The deposit weighed 0.065 gm. The black deposit was graphene/graphene oxide. The deposit was examined for contact angle, Fourier transform infrared spectroscopy, thermogravimetric analysis, and X-ray diffraction. TGA shown in FIG. 6 demonstrates that graphene is present in the solid black product obtained in Example 1.

The weight loss around 100° C. may be due to water evaporation. Thereafter the weight loss is due to oxidation of graphene to carbon dioxide. This reaction is dependent on single sheet to multiple sheets of graphene. The flat region above 593 K is due to graphene oxide whose decomposition is reported to be around 3773 K in literature.

The black particles are composed of graphene and graphene oxide. Graphene oxide has a decomposition temperature around 3773 K and hence would not be affected. Graphene would be oxidized to carbon dioxide that will result in weight loss. This loss occurs in two stages perhaps due to the number of layers constituting graphene. Assuming thicker layers will require higher temperature than thinner layers. Finally, what is present after 793 K is graphene oxide.

Example 2

Example 2 was performed with the same configuration as in Example 1 at a current density of 300 mA/cm$^2$ by connecting to Gamry Instruments Potentiostat/galvanostat in chronopotentiometric mode. This yielded similar results as shown above with respect to Example 1. This electrolysis was performed for thirty minutes.

Example 3

Example 3 was carried out with the same configuration as in Example 1 above but using 10% toluene in deionized water as the bath and passing a current of 2-8 mA and a voltage of 50 V. This produced a similar deposit on the copper cathode to that described above. This electrolysis was conducted over nearly sixteen hours.

Figure 7A:
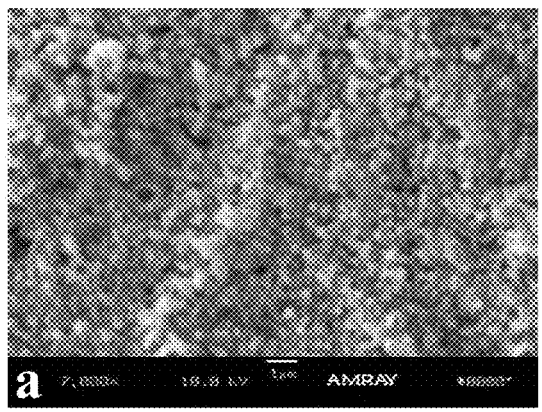
FIG. 7a is an SEM image of carbon nano-structure deposition onto copper from a toluene solution (a) and FIG. 7b is an SEM image of carbon nano-structure deposition onto copper from carbon tetrachloride deposition (b)
Figure 7B:
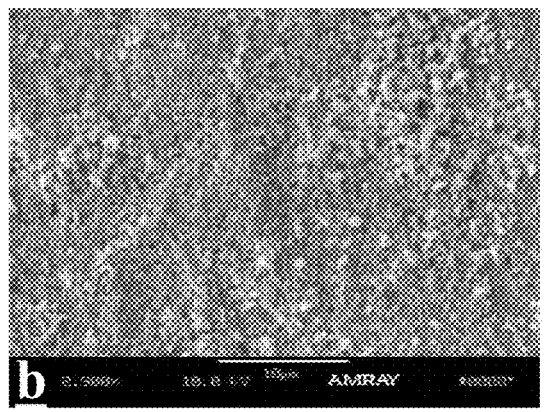

As seen in Examples 1-3, two different bath solutions, one containing water and toluene and the other containing water and carbon tetrachloride, were used to deposit a carbon nano-structure onto a copper surface. Deposition characteristics were analyzed. An SEM imaging of the Example 3 toluene-containing bath deposition (FIG. 7a) appears spongy and coral like, suggesting that graphene may have been deposited. An SEM imaging of Example 1 results in FIG. 7b shows the deposition of carbon nano-structures onto copper using the carbon tetrachloride-containing bath. Again, the deposition appears coral like and spongy, much like the toluene-containing bath deposition.

The contact angle measurement of the deposition indicates the hydrophobicity the surface. FIG. 8a shows the contact angle measurement of the toluene deposition of Example 3, had an average of 34.5°, indicating a hydrophilic characteristic. FIG. 8b shows the carbon tetrachloride deposition of Example 1 had an average contact angle of 146.3°, indicating a hydrophobic surface property.

Figures 9A, 9B:
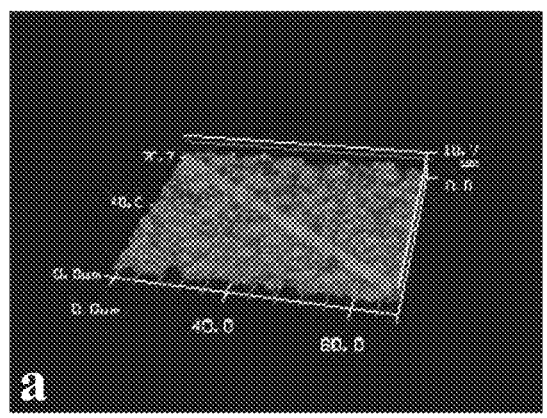
FIG. 9a is a Laser Confocal SEM image of the toluene (a) deposition surface having a maximum height of approximately 7 µm and FIG. 9b is a Laser Confocal SEM image of the carbon tetrachloride (b) deposition surface having a maximum height of approximately 5 µm.

The deposition thickness was determined using laser confocal imaging. FIGS. 9a and 9b show the surface morphology of the deposited surfaces for the toluene and carbon tetrachloride depositions, respectively. The toluene deposition had an average height of 4.08 µm, with a maximum height of 7 µm, while the carbon tetrachloride deposition had an average height of 3.34 µm and a maximum height of 5 µm.

Example 4

In this example graphene powder is produced in solution. The graphite and copper electrodes were individually connected to copper wires and coated with paraffin wax or para film to expose only the 1 cm×1 cm central areas of the electrodes facing each other and the electrodes were placed in two Teflon spacers similar to that described in Example 1. A clean 50 ml beaker is washed with deionized water and clamped rigidly to a stand. The electrochemical bath is made by mixing 13.5 ml deionized water with 1.5 ml of carbon tetrachloride to give a 10% solution. The entire solution is added to the beaker after a short shake of the solution. The electrode assembly is placed inside the beaker. The copper leads were not in contact with the solution. A temperature sensor was also placed inside the bath to record the temperature. The electrodes were connected to a constant current power supply through a current meter. A current of 100 mA was set with an applied voltage of 20 V. During this electrolysis, gas bubbles visibly appear. The temperature of the bath rose from 295 K to 315 K.

Figure 10:
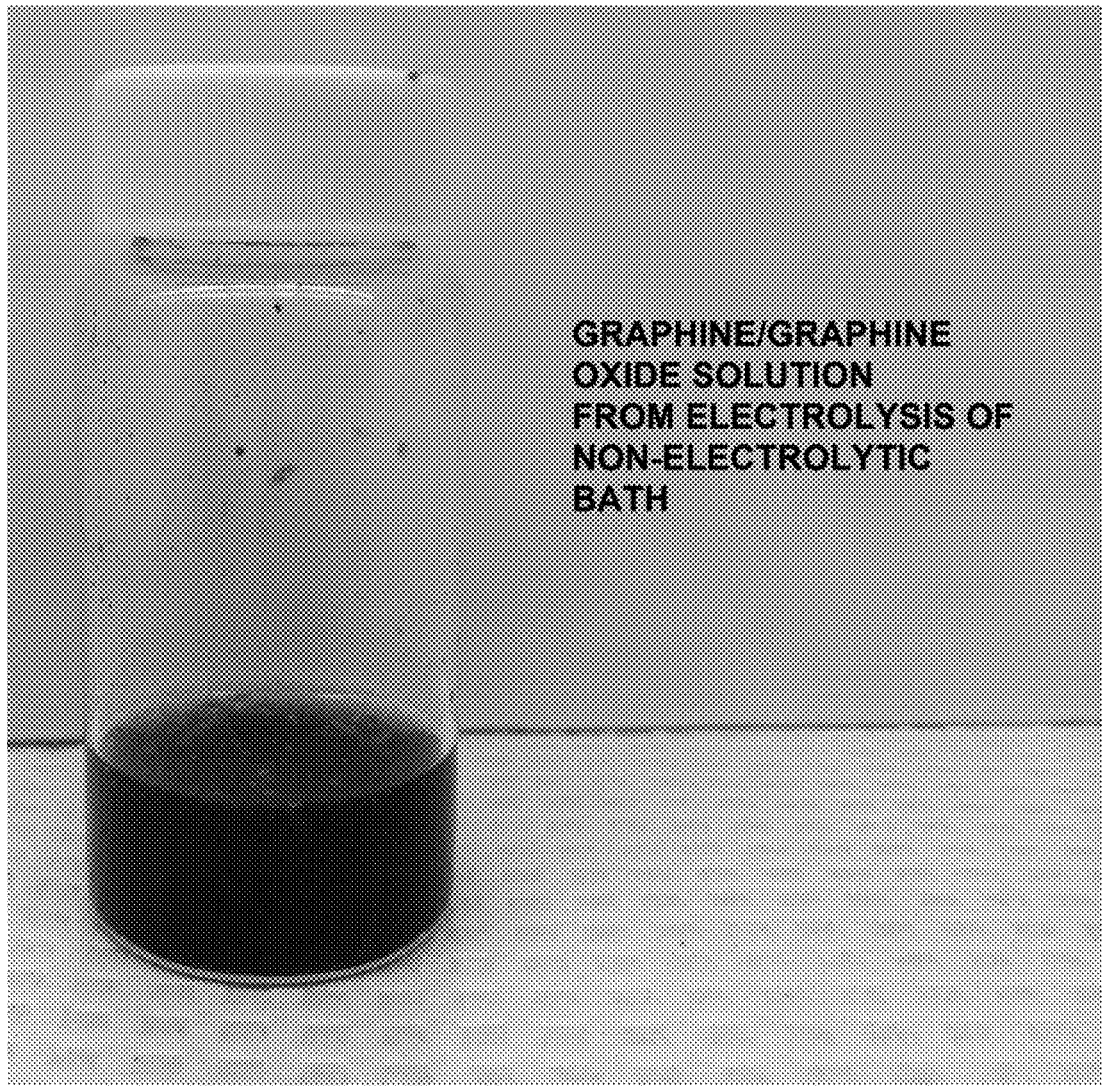
FIG. 10 is a picture of the graphene/graphene oxide solution produced from the electrolysis of a non-electrolytic bath in accordance with an embodiment of the present disclosure.

After two hour electrolysis, the electrodes were taken out of the beaker and the contents in the beaker were examined. The solution was brownish black with black particles suspended in it. FIG. 10 shows the graphene solution that was obtained after the electrolysis.

Figure 11:
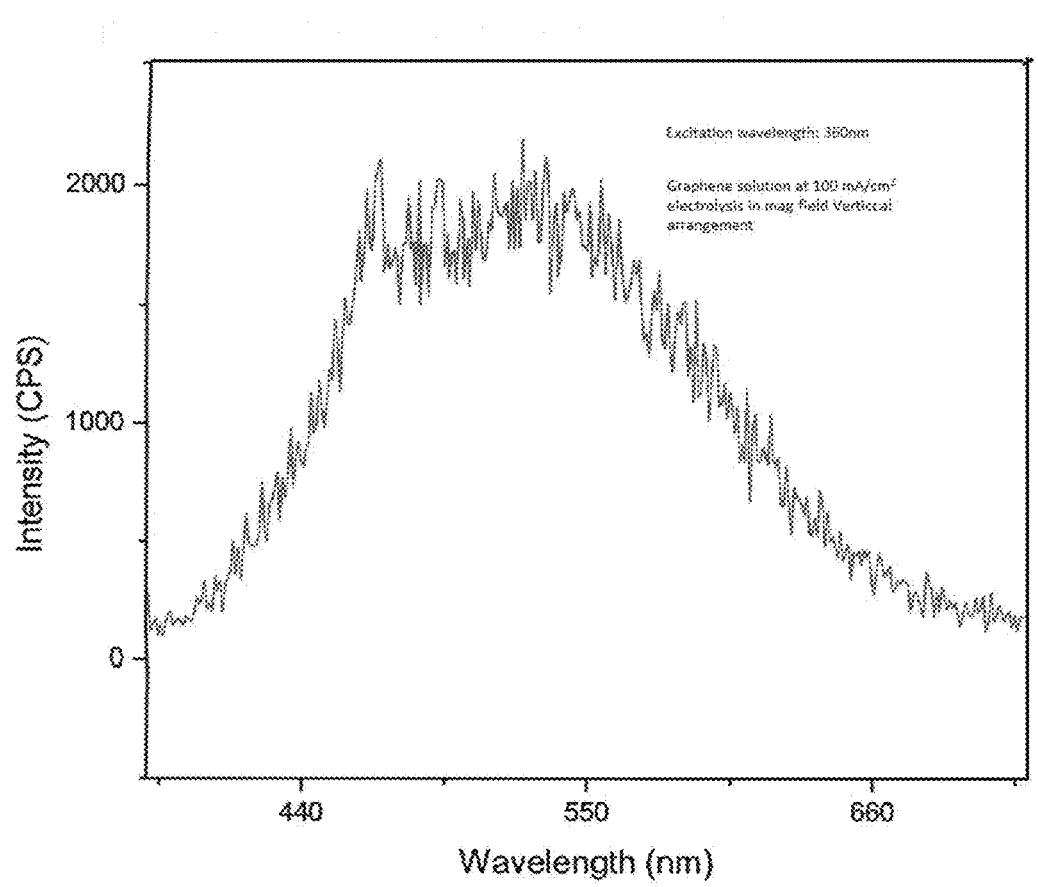
FIG. 11 is a fluorescence spectrum of the graphene solution obtained in Example 4.

The solution was examined for electrochemical features, Fourier transform infrared spectroscopy, UV-VIS spectroscopy and fluorescence spectroscopy. The solution was evaporated to obtain the solid. The fluorescence spectrum shown in FIG. 11 matches with the chemically produced graphene [Fluorescence of chemically derived graphene: Effect of self-rolling and aggregation, by X. F. Zhang, S. Lui and X. Shao, J. Luminescence, volume 136, page 32-37 (2013)]

Example 5

Example 5 was carried out with the same configuration as in Example 4 but at a current density of 300 mA/cm² by connecting to Gamry Instruments Potentiostat/galvanostat in chronopotentiometric mode. The resulting graphene powder was dispersed in the solution, which was filtered and analyzed.

The total weight of graphene and graphene oxide wet for Examples 4 and 5 amounted to 0.20 g/$5.5\times10^{-3}$ F which amounts to 100% pure carbon in the form of graphene/graphene oxide. Based on the thermogravimetric analysis of the sample obtained, 12.5% of it was determined to be graphene oxide and 87.5% graphene. In this example, the area of graphite electrode was 1 sq.cm.

| Time, min | Q (Coulombs)/cm² | Yield of Graphene, g | Yield of graphene oxide, g |
|---|---|---|---|
| 30 | 535 | 0.175 | 0.025 |
| 1440 (1 day) | 25920 | 8.47* | 1.21* |

*Estimated for one day electrolysis with one sq · cm area.

Example 6

Figure 2B:
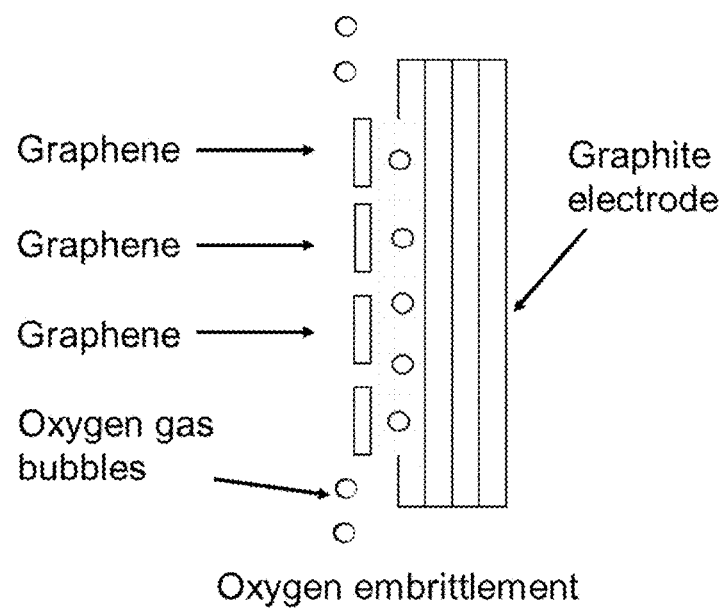
FIG. 2b is a drawing illustrating oxygen embrittlement and graphene exfoliation in an electrochemical bath in accordance with an embodiment of the present disclosure.

In this example a graphene/graphene oxide metal composite is produced. The graphite and copper electrodes were individually connected to copper wires without insulation as shown in FIG. 2. The electrodes were insulated by paraffin wax or para film to expose only 1 cm×1 cm central areas of the electrodes facing each other.

The electrodes were placed in two Teflon spacers 1 mm apart, similar to that described in Example 1. A clean 50 ml beaker was washed with deionized water and clamped rigidly to a stand. The electrochemical bath was made by mixing 13.5 ml deionized water with 1.5 ml of toluene to give a 10% solution. This entire solution was added to the beaker after a short shake of the solution. The electrode assembly was placed inside the beaker. The copper leads were in contact with the solution. A temperature sensor was also placed inside the bath close to the anode but well in the liquid to record the temperature. The electrodes were connected to a constant current power supply through a current meter. A current of 300 mA was set with an applied voltage of 20 V. During this electrolysis, gas bubbles visibly appeared. The temperature of the bath rose from 295 K to 333.3 K.

After ninety minutes of electrolysis, the electrodes were taken out of the beaker and examined for the deposits on the copper electrode. There was a thick deposit on the copper electrode that was examined by X-ray diffraction. It showed two theta reflections at 10° and 19°, 43.6°, 50.8° and 74.4°. The first two reflections are attributed to graphene oxide. The other three reflections are due to Cu (111), (200) and (220). The FTIR spectrum showed the vibrational stretching at 1780 cm$^{-1}$ and 1010 cm$^{-1}$. The deposit was analyzed for copper by cyclic voltammetry.

Analysis of copper-graphene/graphene oxide composite by cyclic voltammetry from Example 6. Graphene-copper composite green solution. Made from 10% toluene-water at Current density: 300 mA/cm$^2$; W.E: Pt microdisc electrode; Counter: Pt wire electrode; Potential: vs SCE; Sweep rate: 50 mV/s.

Figure 12:
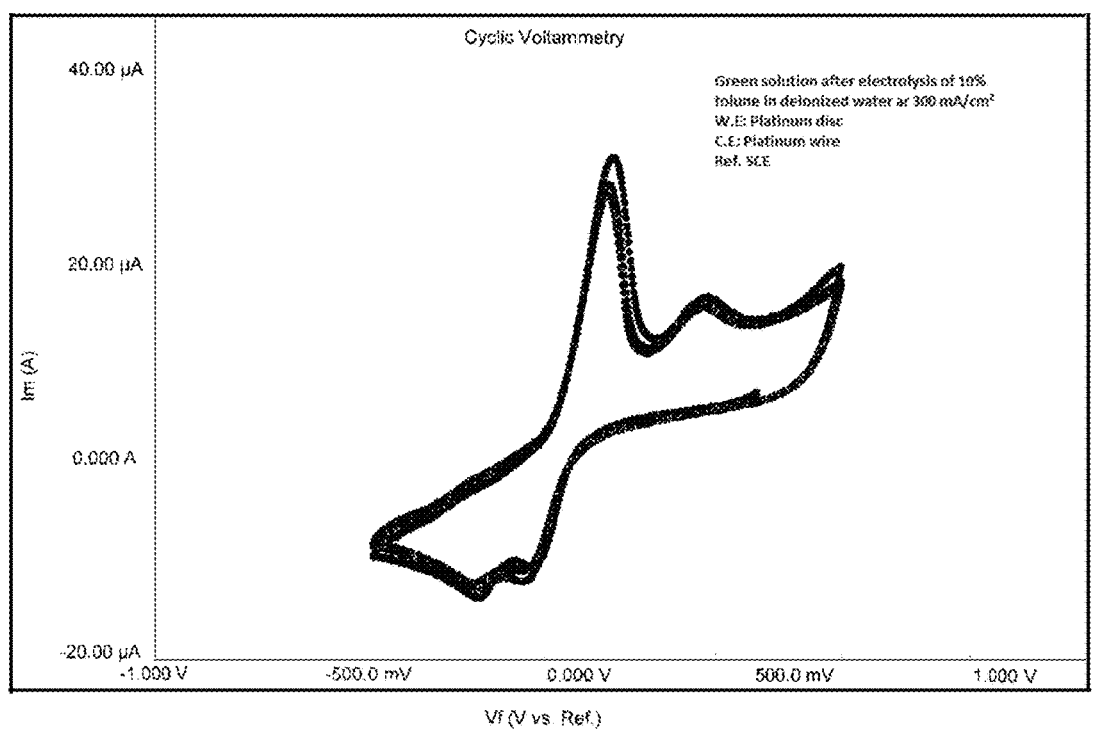
FIG. 12 is a cyclic voltammetry plot for the copper-graphene/graphene oxide composite by cyclic voltammetry from Example 6.

The peaks are identified as the composite of copper shown in FIG. 12. Before cyclic voltammetric sweep, there is anodic current flowing in the solution that is identified as due to the copper-graphene composite. When the sweep is initiated, the two cathodic peaks due to the composite appear at −0.13 V and −0.26 V. Upon sweep reversal, the anodic peak is located at 0.08 V and 0.50V. By comparison of the behavior of a Cu/Cu$^{2+}$ system, the peaks at −0.13 V and 0.08 V are related to copper of copper-graphene and 0.50 V and −0.26 V are associated with the graphene.

Figure 13:
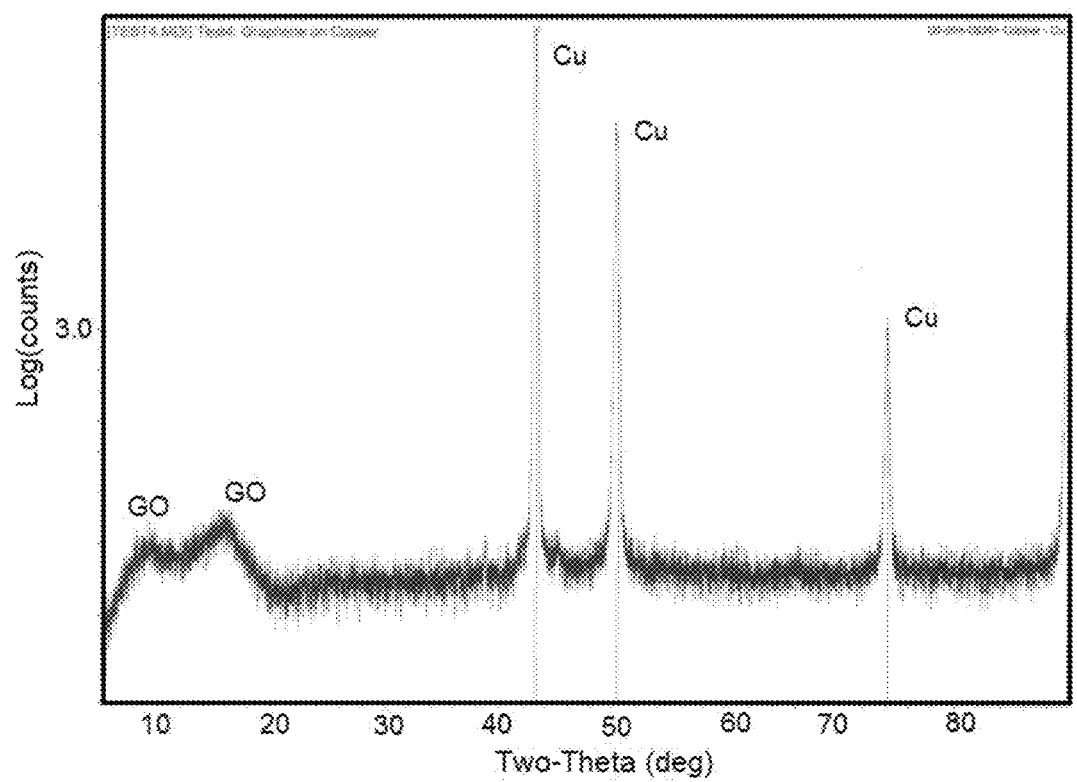
FIG. 13 is an XRD of the copper graphene composite obtained in Example 6.

The XRD of the sample that was deposited on copper electrode is shown in FIG. 13. Well defined features at two theta reflections at 10° and 19° are due to graphene oxide. The other two theta reflections are due to copper. This can be compared with the results reported in the literature for graphene alone.

Example 7

The electrochemical bath that is obtained in Example 4 as shown in FIG. 10 contains both graphene and graphene oxide. This bath is suitable for coating any substrate, including but not limited to metals, non-metals, semi-conductor materials and electronic devices. In one example, a copper plate of 2"×2" is cleaned with 6 M hydrochloric acid and washed with distilled water. The copper plate was dip coated by being placed in the graphene/graphene oxide bath for three minutes and taken out and allowed to air dry. A strongly adherent brownish black deposit was obtained. The contact angle measurements showed a value of 68°. The coating of the substrate material as discussed in Example 7 can be done by any other coating techniques, such as spin coating, spray coating, or painting. This method is advantageous for electronic devices and others for controlling the uniformity and thickness of the graphene/graphene oxide coating. The same methodology can be used for coating the bath obtained in Example 6 containing graphene, graphene oxide, and metal composites.

Example 8

In this example, a bath of deionized water and organic liquid (10%) with a graphite anode and copper cathode applying a current density of 300 mA/cm$^2$ produced 100% pure graphene/graphene oxide in colloidal dispersion. No additives or electrolytes were added to the electrochemical bath. Since the bath was free of these additives or ions, there was no need to purify the sample in multiple steps to prepare pure graphene/graphene oxide.

Example 9

The solution from the electrochemical bath containing 10% carbon tetrachloride was evaporated to dryness to obtain a black solid of graphene/graphene oxide. The solid was examined by Raman spectroscopy. It showed two distinct peaks at 1350 cm$^{-1}$ and 1586 cm$^{-1}$ that are characteristics of breathing mode of the j-point phonons of A1g symmetry and first order scattering of the E2g vibrational mode. This is in agreement with the following literature report. Reference: Cancado, L. G., Takai, K., Enoki, T., Endo, M., Kim, Y. A., Mizusaki, H., Speziali, N. L., Jorio, A., and Pimenta, M. A., 2008, "Measuring the degree of stacking order in graphite by Raman spectroscopy," Carbon, Volume 46(2), pp. 272-75.

The following are examples of making metal composites using the resulting graphene/graphene oxide solution made from a non-electrolyte bath. For this deposition, a bath containing an electrolyte was made as described in the following examples. The electrodes used for electrolysis were copper plate cathode and a counter electrode made of conducting metals as anode.

Example 10 Copper-Graphene Composite

An electrolytic bath was made by mixing 1 ml of the graphene/graphene oxide solution product of Example 1 with 10 ml of 0.1 M sodium sulfate and 10 mM copper sulfate electrolytes. In this experiment, a copper metal substrate 17 mm×17 mm with a depositing area of 1 cm$^2$ was used as the working electrode in the bath for a potentiostatic deposition at −0.30 V vs saturated calomel electrode (SCE). The deposited copper composite was taken out of the bath, washed with distilled water and air dried. This example enabled galvanostatic electrolysis at current densities ranging from 1-300 mA/cm2 for depositing the composite.

Example 11 Zinc-Graphene Composite

An electrolytic bath was made by mixing 1 ml of the graphene/graphene oxide solution product of Example 1 with 10 ml of 0.1 M sodium sulfate and 10 mM zinc sulfate electrolytes. In this experiment, a copper metal substrate 17 mm×17 mm with a depositing area of 1 cm$^2$ was used as working electrode in the bath for a potentiostatic deposition at −1.30 V vs saturated calomel electrode (SCE). This example enabled galvanostatic electrolysis at current densities ranging from 1-300 mA/cm$^2$ for depositing the composite.

Example 12 Cobalt-Graphene Composite

An electrolytic bath was made by mixing 1 ml of the graphene/graphene oxide solution product of Example 1 with 10 ml of 0.1 M sodium sulfate and 10 mM cobalt sulfate electrolytes. In this experiment, a copper metal substrate 17 mm×17 mm with a depositing area of 1 cm$^2$ was used in the bath for a potentiostatic deposition at −1.0 V vs saturated calomel electrode (SCE). This example enabled galvanostatic electrolysis at current densities ranging from 1-300 mA/cm$^2$ for depositing the composite.

Example 13 Nickel-Graphene Composite

An electrolytic bath was made by mixing 1 ml of the graphene/graphene oxide solution product of Example 1 with 10 ml of 0.1 M sodium sulfate and 10 mM nickel chloride electrolytes. In a typical experiment, a metal substrate such as copper of 17 mm×17 mm with a depositing area of 1 cm$^2$ was used in the above bath for a potentiostatic deposition at the potential where nickel ion is reduced. This example enabled galvanostatic electrolysis at current densities ranging from 1-300 mA/cm$^2$ for depositing the composite.

Example 14 Copper-Alloy-Graphene Composite ($Cu_xM_y$)

An electrolytic bath was made by mixing 1 ml of the graphene/graphene oxide solution product of Example 1 with 10 ml of 0.1 M sodium sulfate and a mixture of metal salt electrolytes (Cu salt such as $CuSO_4$ and $M_x(SO_4)_y$ [M is a metal] where x and y are stoichiometric coefficients) in different weight ratios for copper-alloy deposition on copper substrates. In this experiment, a copper metal substrate 17 mm×17 mm with a depositing area of 1 $cm^2$ was used in the bath for a potentiostatic deposition at a potential set at the most negative potential of the two metal ion reductions for forming simultaneously the two metal deposits in a homogeneous phase. By varying the durations of electrolysis, the ratio of metals in the alloys was controlled. This example enabled galvanostatic electrolysis at current densities ranging from 1-300 $mA/cm^2$ for depositing the composite.

Potentiostatic deposition: Holding the potential of the copper chip constant at a set value with respect to a reference electrode, such as saturated calomel electrode in the electrolytic bath.

Although various embodiments have been depicted and described in detail herein, it will be apparent to those skilled in the relevant art that various modifications, additions, substitutions, and the like can be made without departing from the spirit of the disclosure and these are therefore considered to be within the scope of the disclosure as defined in the claims which follow.

What is claimed:

1. An electrochemical process for producing graphene/graphene oxide comprising:
   immersing in an electrolyte-free electrochemical bath, comprising water and an organic liquid, an anode electrode comprising graphite and a cathode electrode comprising an electrically conductive material; and
   applying an electrical potential between the anode and the cathode, sufficient to cause Joule heating and oxidation of the water and cleavage of graphene by embrittlement from the graphite of the anode forming graphene/graphene oxide and at least one of convective migration and electrical migration of the cleaved graphene in the bath.

2. The process of claim 1, wherein the organic liquid comprises toluene, carbon tetrachloride, methylene chloride, methyl amine, or acetonitrile.

3. The process of claim 1, wherein the electrically conductive material comprises non-dissolving metals, Cu, Pt, Ag, Al, Pd, Mo, Rh, Ir, Ti, Ta, Zn, In, Sb, Te, Zr, Pb, W, or alloys.

4. The process of claim 1, wherein the electrically conductive material comprises semiconductors made of inorganic materials, comprising ZnO, $TiO_2$, or $SnO_2$.

5. The process of claim 1, wherein the graphite comprises natural crystalline flake graphite, artificial graphite, natural amorphous graphite, highly oriented pyrolytic graphite, polyacrylonitrile fiber-based graphite, or pitch-based graphite.

6. The process of claim 1, wherein the water comprises deionized water.

7. The process of claim 1, wherein the electrochemical bath comprises from about 1% to about 10% concentration of organic liquid in water.

8. The process of claim 1, wherein the electrochemical bath comprises about a 10% concentration of organic liquid in water.

9. The process of claim 1, wherein the electrical potential applied across the electrodes introduces a current density of from about 0.01 $mA/cm^2$ to about 500 $mA/cm^2$.

10. An electrochemical process for producing graphene/graphene oxide metal composites comprising:
    immersing in an electrolyte-free electrochemical bath, comprising water and an organic liquid, an anode electrode comprising graphite and a metal component and a cathode electrode comprising an electrically conductive material; and
    applying an electrical potential between the anode and the cathode sufficient to cause Joule heating and oxidation of the water and the metal component, formation of ions of the metal, and cleavage of graphene by embrittlement from the graphite anode forming a graphene/graphene oxide metal composite and at least one of convective migration and electrical migration of the cleaved graphene and formed metal ions in the bath.

11. The process of claim 10, wherein the metal component comprises Cu, Pt, Ag, Al, Pd, Mo, Rh, Ir, Ti, Ta, Zn, In, Sb, Te, Zr, Pb, or W.

12. The process of claim 10, wherein the electrochemical bath comprises from about 1% to about 10% concentration of organic liquid in water.

13. The process of claim 10, wherein the electrochemical bath comprises about a 10% concentration of organic liquid in water.

14. The process of claim 10, wherein the electrical potential applied across the electrodes introduces a current density of from about 0.01 $mA/cm^2$ to about 500 $mA/cm^2$.

15. An electrochemical process for producing a metal/graphene composite comprising:
    immersing in an electrolyte-free electrochemical bath comprising a graphene/graphene oxide solution, an anode electrode comprising graphite and a metal component and a cathode electrode comprising an electrically conductive composite-forming material; and
    applying an electrical potential between the anode and the cathode, sufficient to cause deposition of a metal/graphene composite on the cathode.

16. An electrochemical process for producing graphene/graphene oxide comprising the steps of:
    immersing a graphite anode electrode and an electrically conductive material cathode electrode in an electrochemical bath consisting essentially of water and an organic liquid; and
    applying an electrical potential between the anode and the cathode, sufficient to cause Joule heating and oxidation of the water and cleavage of graphene by embrittlement from the graphite of the anode forming graphene/graphene oxide and at least one of convective migration and electrical migration of the cleaved graphene in the bath.

17. The process of claim 16, wherein the organic liquid is toluene, carbon tetrachloride, methylene chloride, methyl amine, or acetonitrile.

18. The process of claim 16, wherein the electrically conductive material is a non-dissolving metal, Cu, Pt, Ag, Al, Pd, Mo, Rh, Ir, Ti, Ta, Zn, In, Sb, Te, Zr, Pb, W, or alloy thereof.

19. The process of claim 16, wherein the electrically conductive material is a semiconductor made of an inorganic material, ZnO, $TiO_2$, or $SnO_2$.

20. The process of claim 16, wherein the graphite is natural crystalline flake graphite, artificial graphite, natural amorphous graphite, highly oriented pyrolytic graphite, polyacrylonitrile fiber-based graphite, or pitch-based graphite.

21. The process of claim 16, wherein the water is deionized water.

22. The process of claim 16, wherein the electrochemical bath is from about 1% to about 10% concentration of organic liquid in water.

23. The process of claim 16, wherein the electrochemical bath is about a 10% concentration of organic liquid in water.

24. The process of claim 16, wherein the electrical potential applied across the electrodes introduces a current density of from about 0.01 mA/cm$^2$ to about 500 mA/cm$^2$.

* * * * *